United States Patent
Krishnaswamy et al.

(10) Patent No.: US 9,639,956 B2
(45) Date of Patent: May 2, 2017

(54) IMAGE ADJUSTMENT USING TEXTURE MASK

(71) Applicant: Google Inc., Mountain View, CA (US)

(72) Inventors: Aravind Krishnaswamy, San Jose, CA (US); Krzysztof Kulewski, Sunnyvale, CA (US); Sevket Derin Babacan, San Francisco, CA (US); Stephen Joseph DiVerdi, Oakland, CA (US)

(73) Assignee: Google Inc., Mountain View, CA (US)

( * ) Notice: Subject to any disclaimer, the term of this patent is extended or adjusted under 35 U.S.C. 154(b) by 13 days.

(21) Appl. No.: 14/575,225

(22) Filed: Dec. 18, 2014

(65) Prior Publication Data

US 2015/0178946 A1 Jun. 25, 2015

Related U.S. Application Data

(60) Provisional application No. 61/918,106, filed on Dec. 19, 2013.

(51) Int. Cl.
| | |
|---|---|
| *G06T 7/40* | (2006.01) |
| *G06T 3/40* | (2006.01) |
| *G06T 11/00* | (2006.01) |
| *G06T 5/00* | (2006.01) |
| *G06K 9/46* | (2006.01) |
| *G06K 9/34* | (2006.01) |

(Continued)

(52) U.S. Cl.
CPC ............. *G06T 7/40* (2013.01); *G06K 9/46* (2013.01); *G06T 3/40* (2013.01); *G06T 5/002* (2013.01); *G06T 7/11* (2017.01); *G06T 7/42* (2017.01); *G06K 2009/4666* (2013.01); *G06T 2207/20012* (2013.01)

(58) Field of Classification Search
CPC combination set(s) only.
See application file for complete search history.

(56) References Cited

U.S. PATENT DOCUMENTS

| | | | |
|---|---|---|---|
| 7,039,222 B2 * | 5/2006 | Simon | G06K 9/00234 348/606 |
| 7,110,000 B2 * | 9/2006 | Zhang | G06T 11/001 345/428 |

(Continued)

FOREIGN PATENT DOCUMENTS

WO 2012049276 A1 4/2012

OTHER PUBLICATIONS

Jitendra Malik et al.; "Textons, Contours and Regions: Cue Integration in Image Segmentation"; Computer Science Division University of California at Berkeley; IEEE International Conference on computer Vision, Corfu, Greece, Sep. 1999.

(Continued)

*Primary Examiner* — Wesner Sajous
(74) *Attorney, Agent, or Firm* — IP Spring

(57) ABSTRACT

Implementations relate to adjusting images using a texture mask. In some implementations, a method includes detecting one or more texture regions having detected texture in an image, and generating a mask from the image based on the detected texture regions. The detected texture regions are distinguished in the mask from other regions of the image that do not have detected texture. The method applies one or more adjustment operations to the image in amounts based on values of the mask.

20 Claims, 9 Drawing Sheets

(51) Int. Cl.
*G06T 7/11* (2017.01)
*G06T 7/42* (2017.01)

(56) References Cited

U.S. PATENT DOCUMENTS

| | | | | |
|---|---|---|---|---|
| 7,587,083 B2* | 9/2009 | Tabata | ............... | G06T 5/008 |
| | | | | 382/162 |
| 7,821,570 B2* | 10/2010 | Gallagher | ............... | G06T 5/20 |
| | | | | 348/221.1 |
| 8,774,470 B1* | 7/2014 | Schmidt | ............... | G06T 7/0081 |
| | | | | 382/113 |
| 2003/0099406 A1* | 5/2003 | Georgiev | ............... | G06K 9/40 |
| | | | | 382/268 |
| 2003/0223622 A1* | 12/2003 | Simon | ............... | G06K 9/00281 |
| | | | | 382/118 |
| 2004/0170337 A1* | 9/2004 | Simon | ............... | G06K 9/00234 |
| | | | | 382/254 |
| 2005/0093875 A1* | 5/2005 | Zhang | ............... | G06T 11/001 |
| | | | | 345/582 |
| 2010/0303348 A1 | 12/2010 | Tolliver et al. | | |
| 2013/0321441 A1* | 12/2013 | Pahwa | ............... | G09G 5/00 |
| | | | | 345/582 |
| 2014/0092221 A1* | 4/2014 | Nagai | ............... | H04N 13/0022 |
| | | | | 348/51 |

OTHER PUBLICATIONS

Teutsch Michael et al.; "Adaptive Real-Time Image Smoothing Using Local Binary Patterns and Gaussian Filters;" 2013 IEEE International Conference on Image Processing; Sep. 15, 2013; pp. 1120-1124; IEEE.

Unser Michael; "Texture Classification and Segmentation Using Wavelet Frames;" IEEE Transactions on Image Processing; Nov. 1, 1995; pp. 1549-1560; IEEE Service Center; Piscataway, New Jersey.

European Patent Office; International Search Report and Written Opinion related PCT/US2014/071175; dated Mar. 25, 2015; 13 pages.

International Bureau of WIPO, International Preliminary Report on Patentability for International Patent Application No. PCT/US2014/071175, Jun. 21, 2016, 9 pages.

\* cited by examiner

IMAGE ADJUSTMENT USING TEXTURE MASK

CROSS REFERENCE TO RELATED APPLICATIONS

This application claims priority to U.S. Provisional Application No. 61/918,106, filed Dec. 19, 2013, and which is incorporated herein by reference in its entirety.

BACKGROUND

The popularity and convenience of digital cameras as well as the widespread of use of Internet communications have caused digital images to become ubiquitous. For example, user-produced digital photographs are posted to various Internet sites, such as web pages, social networking services, etc. for users and others to view. However, many images, such as photographs taken by cameras, can include various features unsatisfying to a user. One typically undesirable feature is the reduction of brightness range encountered in the translation of a real-life scene to a photo or other captured image. Due to the lower dynamic range in captured images, the range of brightness is much less than in the real-life scene, with the result that portions of the brightness range in the image are reduced in contrast. This can lead to details being lost in shadows or other dark areas of the image, or conversely, light areas being washed out of details. To improve such undesirable contrast in images, a user can edit images by adjusting the contrast of images using operations such as local contrast enhancement.

SUMMARY

Implementations relate to adjusting images using a texture mask. In some implementations, a method includes detecting one or more texture regions having detected texture in an image, and generating a mask from the image based on the detected texture regions. The detected texture regions are distinguished in the mask from other regions of the image that do not have detected texture. The method applies one or more adjustment operations to the image in amounts based on values of the mask.

Various implementations and examples of the method are described. For example, the detected texture regions can have a predetermined range of scales of detected texture, where the detected texture at the predetermined range of scales is substantially free of noise at the predetermined range of scales. The detected texture regions can have pixel edges providing texture detail at one or more scales above a noise scale. For example, the texture regions do not include image regions that depict flat features. The method can include converting the image to a monochromatic image before generating the mask. Some implementations can resize the image to a smaller size before generating the mask, and resize the generated mask to the size of the image. The method can further comprise blurring the mask before applying the adjustment operation. In some implementations, detecting one or more texture regions includes using one or more wavelet-based filters, which can include using multiple different scales and directions of wavelet-based filters on the image, and generating the mask can include determining a weighted sum of the responses of the filters. Some wavelet-based implementations can detect texture regions using one or more of Gabor filters, Haar discrete wavelet transforms, Daubechies wavelet transforms, etc.

The mask can include multiple values, where each value of the mask can correspond to a pixel of the image, and each value of the mask can indicate an amount which the one or more adjustment operations are to be applied to the corresponding pixel of the image. The mask can include a continuous range of values between extreme values that indicate full application of the one or more adjustment operations and no application of the one or more adjustment operations. For example, the values of the mask can indicate to apply the adjustment operation by a greater amount (e.g., more strongly) to the detected texture regions and by a lesser amount (e.g., less strongly) to the other regions of the image not having detected texture. In some implementations, the one or more adjustment operations can include a local contrast enhancement operation, and the values of the mask can indicate to apply the local contrast enhancement operation by a greater amount to the detected texture regions and by a lesser amount to the other regions of the image not having detected texture. In some implementations, the one or more adjustment operations can include a local contrast reduction operation, a blur operation, and/or a de-noising operation, and the values of the mask indicate to apply the operation(s) by a lesser amount to the detected texture regions and by a greater amount to the other regions of the image not having detected texture.

In some implementations, a system can include a storage device and at least one processor accessing the storage device and operative to perform operations. The operations can include detecting one or more texture regions having detected texture in an image, generating a mask from the image based on the detected texture regions, and applying one or more adjustment operations to the image in amounts based on values of the mask, where the detected texture regions are distinguished in the mask from other regions of the image that do not have detected texture. In some implementations, the detected texture regions can have pixel edges providing texture detail at one or more scales above a noise scale. The mask can include values indicating to apply the one or more adjustment operations by a greater amount to the detected texture regions and by a lesser amount to the other regions of the image not having detected texture.

In some implementations, a computer readable medium has stored thereon software instructions that, when executed by one or more processors, cause the one or more processors to perform operations. The operations can include detecting one or more texture regions having detected texture in an image, generating a mask from the image based on the detected texture regions, and applying one or more adjustment operations to the image in amounts based on values of the mask, where the detected texture regions are distinguished in the mask from other regions of the image that do not have detected texture. In some implementations, the detected texture regions can have pixel edges providing texture detail at one or more scales above a noise scale. The mask can include values indicating to apply the one or more adjustment operations by a greater amount to the detected texture regions and by a lesser amount to the other regions of the image not having detected texture. In some implementations, logic can be encoded in one or more tangible media for execution by the one or more processors and when executed operable to perform operations similarly as described above.

DETAILED DESCRIPTION

Figure 1:
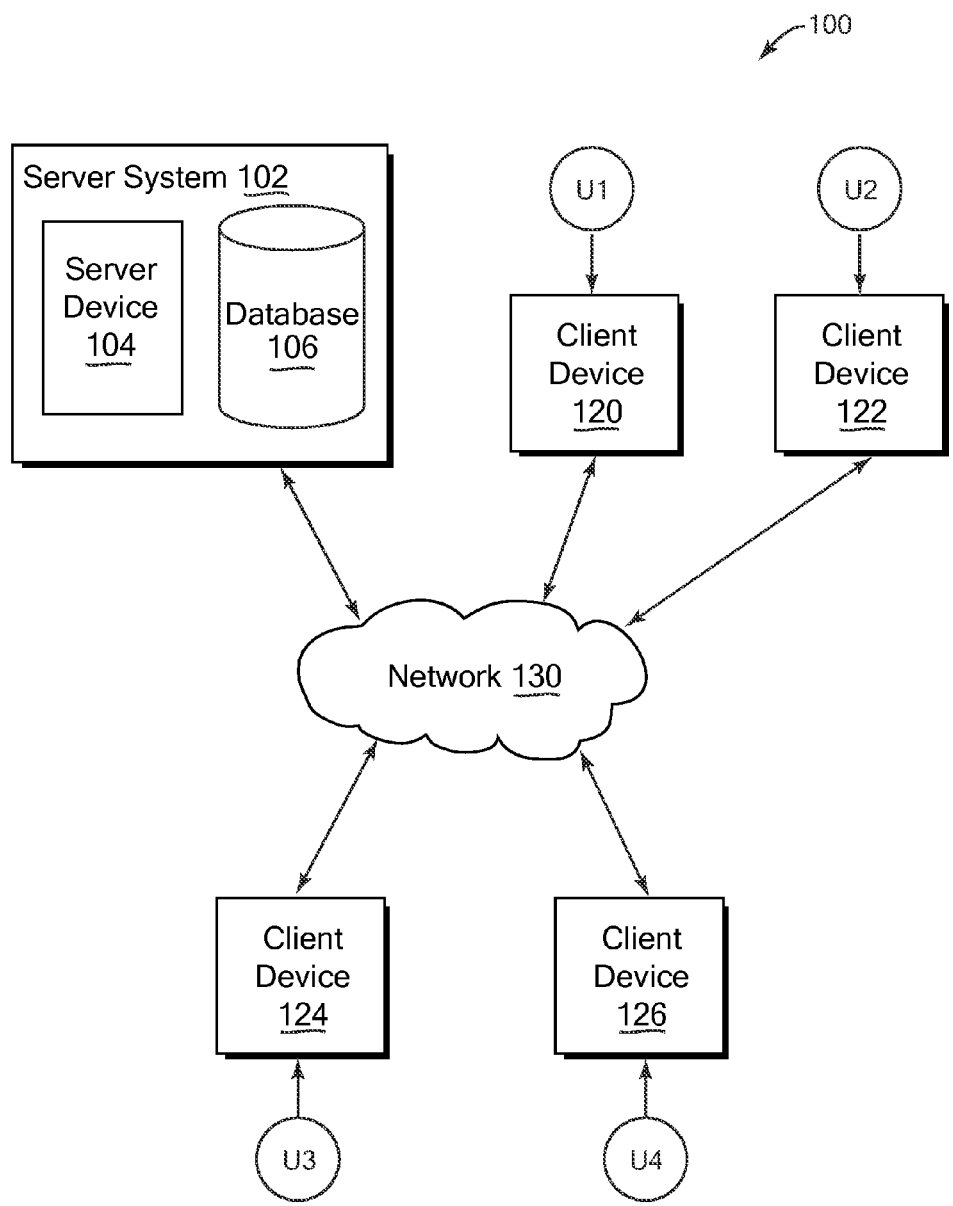
FIG. 1 is a block diagram of an example network environment which may be used for one or more implementations described herein.

One or more implementations described herein relate to adjusting images using a texture mask. Various implementations provide detection of texture regions of an image, generation of a mask based on the detected texture regions, and application of one or more adjustment operations to the image based on the mask. Such features allow a user to easily and automatically adjust characteristics of an image based on texture in that image, thus promoting easier, quicker, and higher-quality editing operations for images.

For example, features described herein can allow adjustment operations to be applied to an image in ways promoting overall image quality, especially in comparison to previous techniques. For instance, local contrast enhancement operations can be used to improve digital image quality. Users may have previously applied such an operation to the entire image. However, some images have noisy areas created due to, e.g., low resolution of optical instrument that captured the image, low amount of light for image capture, image compression applied to the image, and/or other factors. When local contrast enhancement is applied to the entire image, it is applied both to non-noisy areas containing more details (which is desirable to improve overall image visual quality) and to noisy areas. Application to noisy areas can cause visible amplification of the noise which results in visual artifacts and reduced image visual quality, thus limiting use of local contrast enhancement only to non-noisy, high quality images or reducing the amount (strength) of local contrast enhancement that can be applied to a noisier image. In some cases, users may manually select portions of an image to apply local contrast enhancement, but this selection can be time-consuming and tedious for users.

Features described herein can allow adjustment operations such as local contrast enhancement to be automatically and selectively applied to texture regions of an image having higher detail and not applied to other regions of the image having less texture detail and which are more prone to include noise. Higher-detail texture regions are automatically detected and a mask is generated based on these texture regions. An adjustment operation such as local contrast enhancement, local contrast reduction, blur, de-noising, etc., is then applied based on the mask values. This allows higher-detail regions and lower-detail (e.g. flat) regions in the image to be distinguished and adjustment operations scaled to these types of regions appropriately, avoiding amplification of noise and/or reduction of the effectiveness of the adjustment operations and robustly providing higher image quality. Furthermore, the user need not employ time-consuming and complex manual tasks to select desired regions for processing, since features herein can automatically detect texture regions. Thus, a technical effect of adjusting an image as disclosed herein includes the reduction in duration of editing images, thus saving a user time, energy, and resources for achieving edits to images. Another technical effect is a higher quality of edits to images resulting from selective application of adjustment operations to regions in the image most appropriate to receive those operations.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, laptop computer, portable device, cell phone, smart phone, tablet computer, television, TV set top box or entertainment device, display glasses or goggles, wristwatch, personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via a social network service and/or other network service implemented on server system 102, where respective client devices 120, 122, 124, and 126 transmit communications and data to one or more server systems such as system 102, and the server system 102 provides appropriate data to the client devices such that each client device can receive content uploaded to the network service via the server system 102. In some examples, a social network service can include any system allowing users to perform a variety of communications, form links and associations, upload and post shared content, and/or perform other socially-related functions. For example, the social network service can allow a user to send messages to particular or multiple other users, form social links in the form of associations to other users within the social network system, group other users in user lists, friends lists, or other user groups, post or send content including text, images, video sequences, audio sequences or recordings, or other types of content for access by designated sets of users of the social network service, send multimedia information and other information to other users of the social network service, edit such multimedia information, participate in live video, audio, and/or text chat or teleconferencing with other users of the service, etc. As used herein, the term "social networking service" can include a software and/or hardware system that facilitates user interactions, and can include a service implemented on a network system.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations of features described herein can use any type of system and/or service. For example, any type of electronic device can make use of features described herein. Some implementations can provide these features on client or server systems disconnected from or intermittently connected to computer networks. In some examples, a client device having a display screen can display images and provide features and results as described herein that are viewable to a user.

Figure 2:
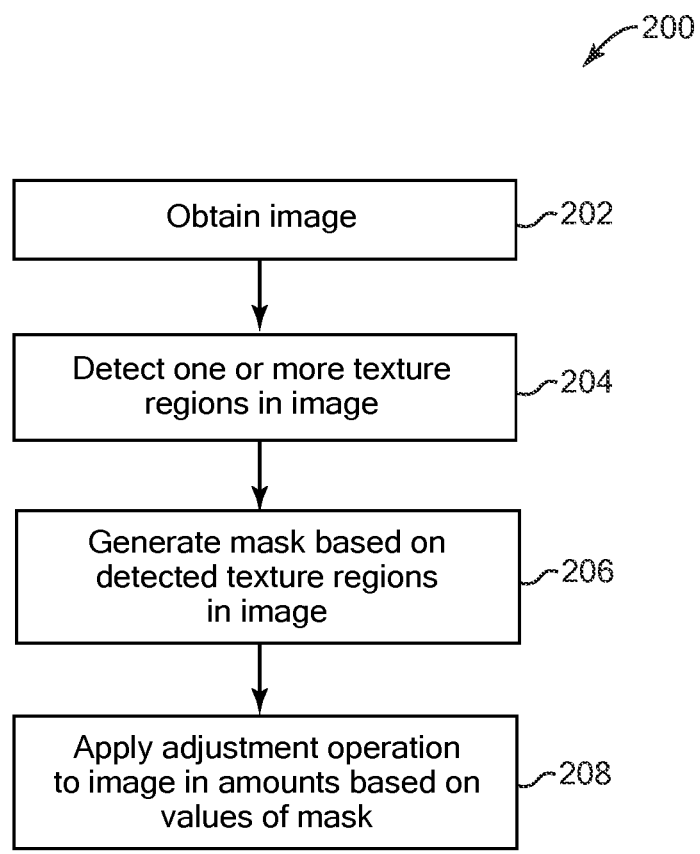
FIG. 2 is a flow diagram illustrating an example method for adjusting an image using a texture mask, according to some implementations.

FIG. 2 is a flow diagram illustrating one example of a method 200 for adjusting an image using a texture mask. In some implementations, method 200 can be implemented, for example, on a server system, e.g., server system 102 shown in FIG. 1. In other implementations, some or all of the method 200 can be implemented on a system such as one or more client devices, and/or on both a server system and a client system. In described examples, the implementing system includes one or more processors or processing circuitry, and one or more storage devices such as a database 106 or other storage. In some implementations, different components of one or more servers and/or clients can perform different blocks or other parts of the method 200. Method 200 can be implemented by computer program instructions, software instructions, logic, and/or code, which can be executed on a computer, e.g., implemented by one or more processors (e.g., microprocessors or other processing circuitry) and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 200 can be implemented in hardware (logic gates, etc.), or in a combination of hardware and software. The method 200 can be performed as part of or component of an application running on the system, or as an application or software running in conjunction with other applications and operating system.

In some implementations, method 200 can be initiated based on user input. A user may, for example, have selected the initiation of the method 200 from an interface such as an application interface, a social networking interface, or other interface. In other implementations, the method 200 can be initiated automatically by a system. For example, the method 200 (or parts thereof) can be periodically performed, or performed based on one or more particular events or conditions such as a user opening an application such as an editing application, receiving one or more images that have been newly uploaded to or accessible by the system, etc. In some implementations, such conditions can be specified by a user in custom preferences of the user. In one non-limiting example, method 200 (or parts thereof) can be performed on a camera, cell phone, or other client device that has captured one or more images. In addition or alternatively, the client device can send images to a server over a network, and the server can process the images using method 200.

In block 202 of method 200, the method obtains an image for processing. The image can be a digital image composed of multiple pixels, for example, and can be stored on one or more storage devices of the system or otherwise accessible to the system, such as a connected storage device, e.g., a local storage device or storage device connected over a network. For example, the image can be a photo captured by a camera, an image frame extracted from a captured video stream or other video data, or derived from a different source. In some implementations, a user can provide or designate one or more images to process. In other implementations, the image can be automatically selected by the method, e.g., as an image from an album or other collection of multiple images, such as an album provided in an account of a user of a social networking system. In some examples, the system can determine which image to obtain based on evaluating one or more characteristics of accessible images, such as the color distributions of images, timestamps and other metadata of images, and/or identified and recognized content depicted in the images, such as persons, faces, or objects.

In block 204, the method detects one or more texture regions in the image, where each texture region includes detected texture. Each texture region is a portion or sub-area of the image including a number of the image's pixels, for example. "Texture," as referred to herein, is an arrangement of pixels in an area of the image, where at least some of the pixels have edges to provide visible details of features within the arrangement of pixels. Such edges are differences in color, intensity, or other pixel values between adjacent or nearby pixels, where the greater the difference, the stronger the appearance of edges. The edges within a texture region can be arranged randomly, or in a particular order, and the texture may have an exact or approximate frequency based on the regular spacing of edges (or the spacing of larger features composed of edges) within the texture region. Texture can exist or be detected at different scales in an image, where a smaller scale shows many small (e.g., even pixel-sized) edges (e.g., details), and a larger scale shows larger features within the arrangement created by edges, such as the appearance of wood grain, tiles, corduroy lines, fur, etc., and an even larger scale portrays large objects such as clouds and smoke-like features within the clouds. In another example, a flat or featureless region having a small, gradually-changing range or gradient of similar pixel colors does not include any texture, such as a clear portion of sky, a smooth wall, a still lake, etc. (such regions are referred to herein as "flat" due to their lack of stronger edges, even though the subject depicted in the image may not actually be flat).

In some implementations, the detected texture regions are desired to not include noise, e.g., to be substantially free of noise, at the detected scale(s) of texture. Noise occurs as random pixel-level variations in color or other pixel value in images, and can be caused by sensor technology, ISO speed and/or exposure time on cameras, digital processing, etc. Noise often occurs, and/or is most noticeable to human viewers of the image, in portions of the image that have no or small amounts of texture. In some cases, texture details (e.g., edges) are small enough (e.g., detected at a small enough scale) such that they are indistinguishable from noise. Thus, the texture regions detected in block 204 can have a predetermined range of scales of texture above a scale of noise, e.g., have pixel edges that have a strength, or provide texture detail, at one or more scales above a noise scale at which noise edges are detectable. In some implementations, the detected texture regions include image areas depicting non-flat features and do not include image areas that depict flat features, since such flat features are only likely to have edges caused from noise.

The texture regions can be detected using any of a variety of techniques. Some examples are described in greater detail below.

In block 206, the method generates a mask from the image based on the detected texture regions. The detected texture regions are distinguished in the mask from other, non-texture regions of the image that do not have detected texture. The mask can cover the entire image in some implementations, or can only cover a portion of the image in other implementations. For example, the mask can include multiple values, where each value corresponds to a different pixel of the image, and each value indicates an amount by which the adjustment operation is to be applied to the corresponding pixel of the image. In some implementations, the mask includes a continuous range of values, each value indicating a zero, partial or full amount by which the adjustment operation is applied, while other implementations can have just two possible mask values to indicate application of the operation or not. Some examples of a mask and the generation of a mask are described in greater detail below.

Other implementations of a mask can include multiple values at each pixel position of the mask corresponding to each pixel of the original image. Multiple per-pixel values can be used, for example, to change behavior of the operation being applied in a different way in every color channel. For example, a mask can include three values at each pixel position of the mask, each value corresponding to an amount of local contrast enhancement to be applied one of the channels R, G, B of the original image. Multiple per-pixel values can also be used to control application of multiple different adjustment operations to each pixel of the image. For example, a mask can include two values per pixel position, where each value is associated with and controls a different adjustment operation. In one example, the associated adjustment operations can be brightness and contrast adjustment operations, where the two-value mask changes application of each of these operations by a different amount at each pixel based on the mask values.

In block 208, the method applies one or more adjustment operations to the image in amounts based on values of the mask. For example, the method can examine a pixel position of the mask and retrieve the mask value of that position, and the method applies an adjustment operation to the corresponding pixel of the image based on that retrieved mask value, e.g., the mask value indicates to apply the adjustment operation by a certain amount or in a certain way (e.g., spatially, time-based, with certain parameters, etc.). Some examples are described in greater detail below. The adjustment operation(s) are applied to all of the pixels of the image which correspond to positions in the mask. Some examples of adjustment operations suitable for block 208 are described in greater detail below. The output of the adjustment operation(s) can be provided in an output image, in some implementations.

Thus, the method allows one or more adjustment operations to be automatically applied to pixels in an image by amounts that vary based on whether or by how much a particular target pixel includes detected texture. This allows, for example, adjustment operations such as local contrast enhancement to be applied automatically in an image to appropriate regions of the image, e.g., to enhance areas having texture with higher amounts of detail ("higher-detail" regions), and to ignore or reduce application of the operation to the areas having less or no texture. Therefore, the non-texture regions (including low-texture regions), which typically have more noise, will automatically not have their noise increased or amplified from the adjustment operation. Similarly, texture regions will automatically not be processed by contrast-reducing operations or other types of operations not suitable for texture regions. Thus, higher quality images can result automatically from performance of the method. In addition, less effort and resources are needed for a user to effectively edit an image with an adjustment operation, since the user does not have to manually indicate portions of the image to apply the adjustment operation as in previous editing tools.

Figure 3:
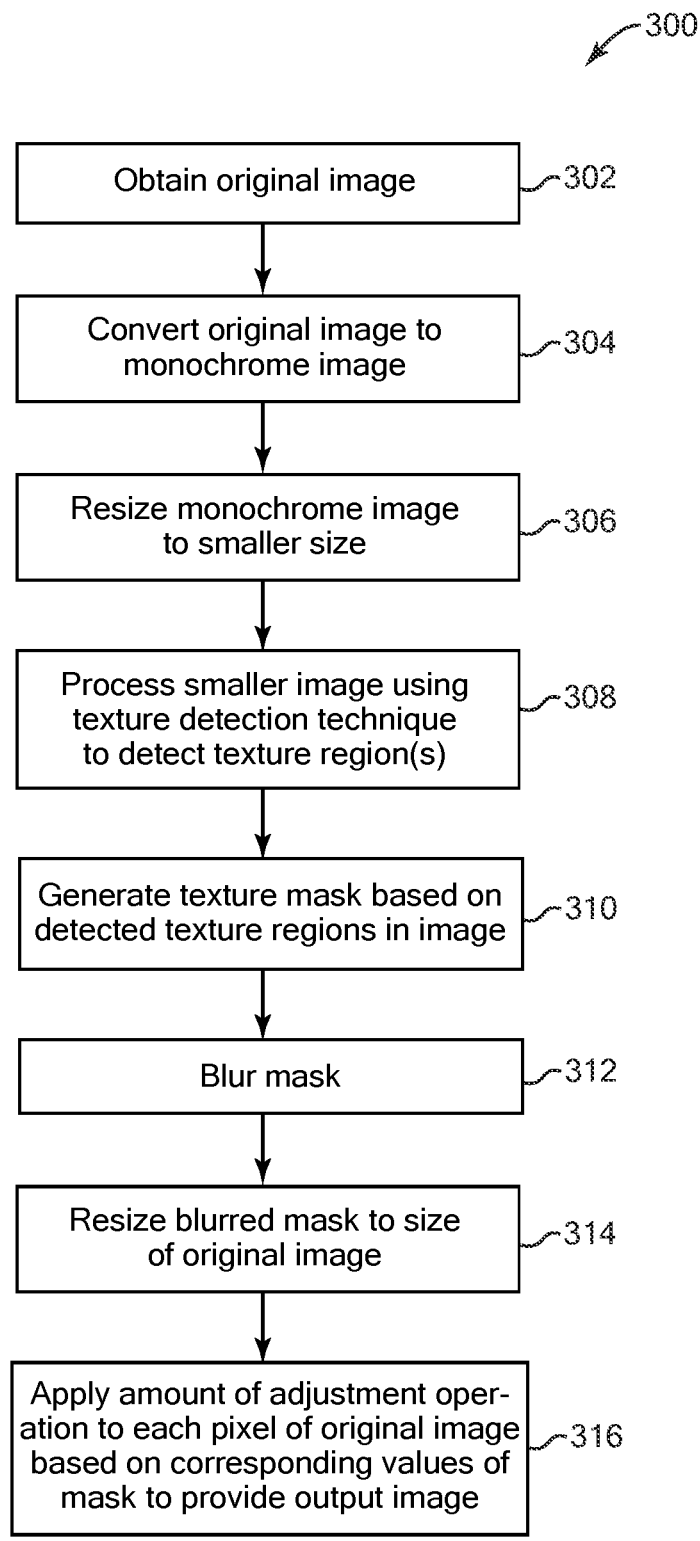
FIG. 3 is a flow diagram illustrating another example method for adjusting an image using a texture mask, according to some implementations.

FIG. 3 is a flow diagram illustrating an example method 300 for adjusting an image using a texture mask, according to some implementations. Method 300 can be implemented by a system such as a server and/or client device as described above for method 200.

In block 302, the method obtains an original image. For example, the image can be obtained similarly as described above in block 202 of FIG. 2. The image can be an RGB (red, green blue) image in some implementations, or can be provided in a color space such as YUV or others, or can be a monochrome (e.g., grayscale) image. In block 304, the method converts the original image (such as a color (e.g., RGB) image) to a monochromatic (e.g., grayscale) image. This can be performed using any of a variety of techniques. For example, the method can determine a weighted average of pixel values in R, G, and B channels, with weights being equal to perceptual RGB luminance coefficients. Other techniques can be used in other implementations, e.g., using other techniques or coefficients.

In block 306, the method resizes the grayscale image to a smaller size than the size of the grayscale image. This can be performed in some implementations to reduce computational complexity in performing one or more following blocks of method 300. Block 306 can cause the successive blocks of method 300 to be less sensitive to local variations in the texture of texture regions of the image, and can even include an effect of de-amplifying noise present in the image in some cases. The resizing can be performed using any of a variety of techniques. For example, a grayscale image can be resized to be X (e.g., X=10) times smaller in each dimension using, e.g., bilinear sampling. In other implementations, scaling by a different amount can be performed, or the scaling can use a different technique (e.g., bicubic), or scaling/re-sizing (e.g., in blocks 306 and 314) can be omitted from method 300.

In block 308, the method processes the smaller image of block 306 using at least one texture detection technique to detect (e.g., segment) texture regions in the smaller image, where each texture region includes detected texture. Any of a variety of texture detection techniques can be employed to extract representations of how much texture detail exists at one or more particular scales and at one or more particular locations in the image (e.g., where contiguous locations of texture form texture regions). In some implementations, the texture detection technique can be performed at multiple predetermined scales which are known to be of interest. For example, previous testing of sample images can lead to conclusions of the scales that are suitable to use which will not detect noise at smaller scales and which will detect larger texture regions or textural objects at larger scales.

In some implementations, one or more wavelet-based filters can be used for texture detection, which use wavelet transforms to provide wavelet responses at different scales. One type of wavelet-based filter is a Gabor filter. Gabor filters can use filtering in the frequency and spatial domain to detect edges in images at specified scales and orientations. In some implementations, filtering an image with Gabor filters at different scales and orientations results in a vector of Gabor wavelet responses. A number of different scales of the Gabor filters can be used, and for each scale, the filters can be applied in a number of different orientations (directions in the image). Each scale of Gabor filter detects a different strength or size of edge in the image. Using different scales of Gabor filters allows detection of a variety of scales of texture in the image. For example, a low scale of filter allows detection of small texture details, e.g., pixel edges close to the size of pixels. A medium scale of filter allows detection of middle scale texture details, e.g., regularly spaced floor tiles depicted in an image. A large scale of filter allows detection of large scale texture details, e.g., the borders and interiors of clouds, allowing the detection of the cloud as an object different from its sky background, for example. Using different directions for Gabor filters allows the detection of texture regions in block 308 to be performed in a variety of directions or orientations in the image, thus allowing some invariance in the method to different angular orientations of objects depicted in the image. For example, a particular form of ordered texture such as parallel lines can be detected robustly in multiple orientations within the image.

For example, in one implementation, three different scales can be used and six orientations (directions) can be used for each scale to obtain the Gabor responses. In one example, scales 2, 3, and 4 can be used in an implementations that starts scales from zero, such that scales 0 and 1 are not used. An example of six directions can be 0°, 30°, 60°, 90°, 120°, and 150°. The results of processing such a set of scales and directions can be a vector of 18 Gabor responses. In another example implementation using these scales and directions, two phases can also be used (even and odd), and the squares of both phase responses are summed to get one response per direction. Thus there can be 36 Gabor responses that are combined into 18 responses using such sums. The particular Gabor filter parameters used can be any well-known parameters. For example, some implementations can use parameters similar to parameters chosen in J. Malik et al., "Textons, Contours and Regions: Cue Integration in Image Segmentation," IEEE International Conference on Computer Vision, 1999, which is incorporated herein by reference in its entirety. Such parameters include two phases (even and odd), three scales (spaced by half-octaves), and 6 orientations (equally spaced from 0 to $\pi$), where the basic filter is a difference-of-Gaussian quadrature pair with 3:1 elongation, and each filter is divided by its L1 norm for scale invariance. Other implementations can use different parameters, a different number of scales, and/or a different number of orientations for generating Gabor responses.

In other implementations, other types of wavelets or wavelet-based filters can be used, e.g., to generate wavelet responses for texture detection. For example, a Haar discreet wavelet transform, Daubechies wavelets and wavelet transform, and/or other type of wavelet or wavelet-based filter can be used, which can be used at particular scales and orientations similarly to the Gabor filters described above. In still other implementations, other texture detection techniques can be used. For example, other types of edge detection techniques (Sobel, etc.) can be used to detect textures at various scales of interest, where the results at different scales can be combined for texture detection for an image.

In block 310, the method generates a texture mask based on the detected texture regions of block 308. In general, the mask can include a value at every pixel position corresponding to the smaller image. This value can indicate the amount of application of the adjustment operation to be applied later in the method. For example, the detected texture regions of the image are approximately at one extreme of the mask value range (e.g., indicating full amount of application, or no application in other implementations), and the other regions of the image without texture are approximately at the other extreme of the mask value range (e.g., indicating no application or full application, based on the implementation used).

For example, in some implementations using Gabor filters (or other types of wavelet-based filters) as described above, the method can combine the wavelet responses obtained in block 308 to determine the mask, where desired scales of texture detection are included in the combination. For instance, the method can take a weighted sum of the Gabor responses obtained in block 308, e.g., a weighted sum of the 18 Gabor responses in the example above. In some implementations, particular Gabor responses can be weighted more than others at particular scales of interest. For example, Gabor responses obtained at a larger scale can be weighted higher (e.g., multiplied by a higher factor) than responses at lower scales, since the Gabor filters may not have detected larger scale textures as easily as smaller scale textures. Other techniques of combining vector of Gabor responses into a single mask can alternatively be used.

In some implementations, the responses from each scale can be combined separately, e.g., with different parameters used to modify responses for each scale. In some examples, each response is multiplied by a factor that is based on the numerical scale for that response. In one example, the resulting sum of the squares of two phase responses described above can be multiplied by 155000*(3+scale), where the scale ranges from 2 to 4 as described above. Then the combined responses from each scale can be combined together into a single result. In some implementations, this result is then multiplied by a factor that converts it to a desired numerical range for the mask. For example, a range of values of 0-255 can be used. This provides a mask having a continuous range of values between extreme values indicating full application of the adjustment operation and no application of the adjustment operation, as described below. Other implementations can combine texture detection at different scales in other ways to obtain a single mask in block 310.

It should be noted that the response values can be weighted and scaled to the desired range using no thresholding. This allows the values of the mask to portray a continuous range of multiple (e.g., more than two) possible values, e.g., allowing substantial avoidance of any large jumps in value between adjacent pixel positions that may cause visible undesired effects when using the mask as described below. Other implementations can use only two values for the mask, such as 0 and 1, to indicate application or no application of the adjustment operation.

In block 312, the method blurs the mask resulting from block 310. This causes a more gradual transition between mask values, reducing large or discreet jumps in values in the mask which may cause visible effects when applying an operation using the mask values. Any suitable blurring operation can be performed. For example, a box filter having a constant kernel (e.g., the same kernel values in the kernel) can be used. In one example, a kernel of size 15 can be used. Other sizes can be used in other implementations. In other implementations, different blur parameters (e.g., kernel size and/or shape) or a different blurring technique can be used, or the blurring in block 312 can be omitted from method 300.

In block 314, the method resizes the blurred mask to match the size of the original image. Any image scaling technique can be used, e.g., bilinear interpolation, bicubic interpolation, etc.

In block 316, the method applies an amount of an adjustment operation to each pixel of the original image based on the corresponding values of the mask, to provide a processed output image. (In some implementations, the adjusted operation is applied to those original image pixels that correspond to mask values, which need not be every pixel in the original image.) An adjustment operation adjusts one or more characteristics in one or more regions of an image (an image "filter" can be considered an adjustment operation in some contexts or implementations). Any of a variety of types of adjustment operations can be used in block 316.

For example, in some implementations, the adjustment operation can be a local contrast enhancement operation. Local contrast enhancement generally means enhancing the contrast within smaller areas of the image, such as within light or dark areas, as opposed to large scale contrast enhancement which is between significant light and dark areas in the entire image range. Local contrast enhancement can include, in some implementations, increasing the contrast between a pixel's value and the mean value of the adjacent pixels in a local area of the image to bring out more detail in the image.

Any type of local contrast enhancement can be used. For example, an "unsharp mask" function can be used at a particular scale to provide local contrast enhancement (such as sharpening of edges), and receives parameters including "radius" to indicate the size of local area of the image being processed for contrast enhancement, and "amount" to indicate the amount by which the contrast between pixels is increased within the radius. One example of an unsharp mask function is described below.

$$g(x,y)=f(x,y)-f_{smooth}(x,y) \quad (1)$$

where $g(x,y)$ is an edge image, and $f_{smooth}(x,y)$ is a smoothed version of original image $f(x,y)$. Equation (1) thus enhances edges and other high frequency components in an image by subtracting the smoothed version of an image from the original image. The resulting edge image is added back into the original image to sharpen the original image. A sharpened image is thus described as follows:

$$f_{sharp}(x,y)=f(x,y)+k*g(x,y) \quad (2)$$

where $f_{sharp}$ is the sharpened image and k is a scaling constant. Larger values of k provide increasing amounts of sharpening. In some implementations, the value k is the "amount" parameter and the "radius" parameter is used to control the size of $f_{smooth}(x,y)$ to provide a sharpened image in a particular area. The parameters such as "amount" and "radius" can be specified by a user, or can be automatically determined based on user preferences, image analysis, default parameters, and/or other stored or retrieved parameters.

Other implementations can use other functions and similar or different parameters to provide local contrast enhancement. For example, some local contrast enhancement operations can build and examine local histograms and determine the amount of contrast increase that is to be applied on a per-pixel basis over the entire image.

The method uses the mask values of the generated mask to modify the amount of local contrast enhancement that is applied to the original image. For local contrast enhancement (or a "structure" operation), the mask can include values that cause the local contrast enhancement operation to be applied in greater amounts to the detected texture regions of the original image, and that cause the local contrast enhancement operation to be applied in lesser amounts to the other non-texture regions of the original image not detected as having texture (e.g., flat regions).

In some implementations, the method retrieves the mask value corresponding to a particular pixel of the original image and uses that mask value to control one or more of the parameters of the functions of the local contrast enhancement operation for that particular pixel of the original image. For example, the mask value can control an "amount" value of local contrast enhancement, such as the amount value k in an unsharp mask function described above. In other implementations, the mask value can influence a "radius" value, such as a radius value used in the $f_{smooth}(x,y)$ function in the unsharp mask example above. The pixel value resulting from the local contrast enhancement operation thus can be inherently affected by the mask value, and can be provided directly as an enhanced pixel of the processed output image.

In other implementations, a mask value can be used not to control parameters of the adjustment operation, but can be used after the operation to scale or modify a resulting pixel value result determined by the operation for a particular pixel of the original image. For example, each mask value can be used as a blending factor for blending the processed pixel resulting from the adjustment operation with the corresponding (unprocessed) pixel of the original image. In some implementations, blending such as an alpha blending can be used between each original image pixel value and the corresponding processed pixel value resulting from the adjustment operation (such as local contrast enhancement) at that same pixel position, where the alpha blending is performed in an amount in accordance with the mask value at that same pixel position. This causes the processed pixel value to be multiplied by the blending factor based on the mask value, and the original unprocessed pixel value to be multiplied by (1-blending factor), and the two values to be then combined. Other implementations can use other ways of scaling or modifying the result of the adjustment operation applied to an original image pixel based on the corresponding mask value at that pixel position.

Other types of adjustment operations can be used in other implementations or cases. For example, a brightness adjustment operation can be used to adjust brightness or luminance values of the pixels of the texture regions as controlled by the mask values. This can be used to highlight or bring out texture regions in an image, such as foreground or in-focus regions, while leaving non-texture regions such as background and/or out-of-focus regions at their original brightness.

For some adjustment operations, an inverse of the mask described above for local contrast enhancement can be used. Thus, the mask can include values that cause the adjustment operation to be applied in lesser amounts to the detected texture regions of the original image, and that cause the adjustment operation to be applied in greater amounts to the other regions of the original image not having detected texture (such as flat regions).

For example, a local contrast reduction operation can use the inverted mask described above. Local contrast reduction reduces the contrast between pixels, e.g., between a pixel's value and the mean value of the adjacent pixels in a local area of the image, to reduce the appearance of detail in the image. This can be used to soften lighting, blur background details, boost shadows, reduces the appearance of glare, reduce wrinkles or other undesired skin features on a face, etc. Thus, the local contrast reduction can be applied in a greater amount to non-texture regions in the original image, which have lower detail that may be desired to be further reduced using the operation. Texture regions of the image would not be desired to have local contrast reduction applied since that would reduce the detail that exists in those regions. For example, features of a background of an image may be slightly out of focus. These features may not be detected as texture regions by the method, and using an inverted mask, local contrast reduction can be applied to these out-of-focus regions to make them more out-of-focus, which can further bring out or emphasize the foreground (in-focus) subject(s) of the image. In some implementations, another type of adjustment operation that can use the inverted mask is a blur operation, which can be used to smooth or otherwise reduce non-texture or background details in the image. For example, details in the background of an image can be blurred, which can cause the foreground subject(s) of the image to be made more clear or prominent.

Another type of adjustment operation that can use the inverted mask is a de-noising operation. Since noise often occurs most frequently in flat regions of the image that do not have much texture, these regions without texture can be directed by the mask values to receive a stronger of amount of the de-noising operation, while texture regions of the image can be directed by the mask values to receive a lesser amount of the de-noising operation.

The result of applying the adjustment operation to all the pixels (or a subset of pixels) of the original image based on the corresponding mask values in block 316 can be a processed output image that includes the pixel results of the adjustment operation as modified by the mask values. The processed output image as well as the mask values and any other information needed by method 300 can be stored in storage device(s) available to the method 300.

In other implementations, the method 300 can be performed separately in all or some image channels (such as R, G, and B channels), where each such separately-processed channel provides its own generated mask. The method can use each of such multiple masks to apply an adjustment operation separately and combine the result, and/or can combine such multiple masks into one common image mask that is used for applying the adjustment operation.

Thus, features described herein can selectively apply an adjustment operation to an image based on an automatically-generated texture mask indicating for every image pixel whether the pixel is part of higher-detail texture region, or part of a lower-detail non-texture region (e.g., which more likely has noise). The mask is used to limit the amount of an adjustment operation (e.g., local contrast enhancement, local contrast reduction, blur, etc.) applied in regions where its application will more likely result in loss of image quality, and to allow full or almost full application of the operation in regions that benefit from the operation. In an example using local contrast enhancement operation, the full amount (or close to full amount) of the adjustment operation can be applied in the higher-detail texture regions. This applied amount can be smoothly reduced according to gradual reduction in mask values (e.g., at the borders of texture regions), and eventually goes to zero application in flat, noisy areas. The opposite application of operation amount can be applied when using other adjustment operations such as local contrast reduction, blur, de-noising, etc.

Various blocks and operations of methods 200 and/or 300 can be performed in a different order than shown and/or at least partially simultaneously, where appropriate. For example, some implementations can perform the methods at various times and/or based on events not related to a user editing an image. In some implementations, blocks or operations of methods 200 and/or 300 can occur multiple times, in a different order, and/or at different times in the methods. In some implementations, the methods 200 and/or 300 can be implemented, for example, on a server system 102 as shown in FIG. 1. In some implementations, one or more client devices can perform one or more blocks instead of or in addition to a server system performing those blocks.

Figure 4:
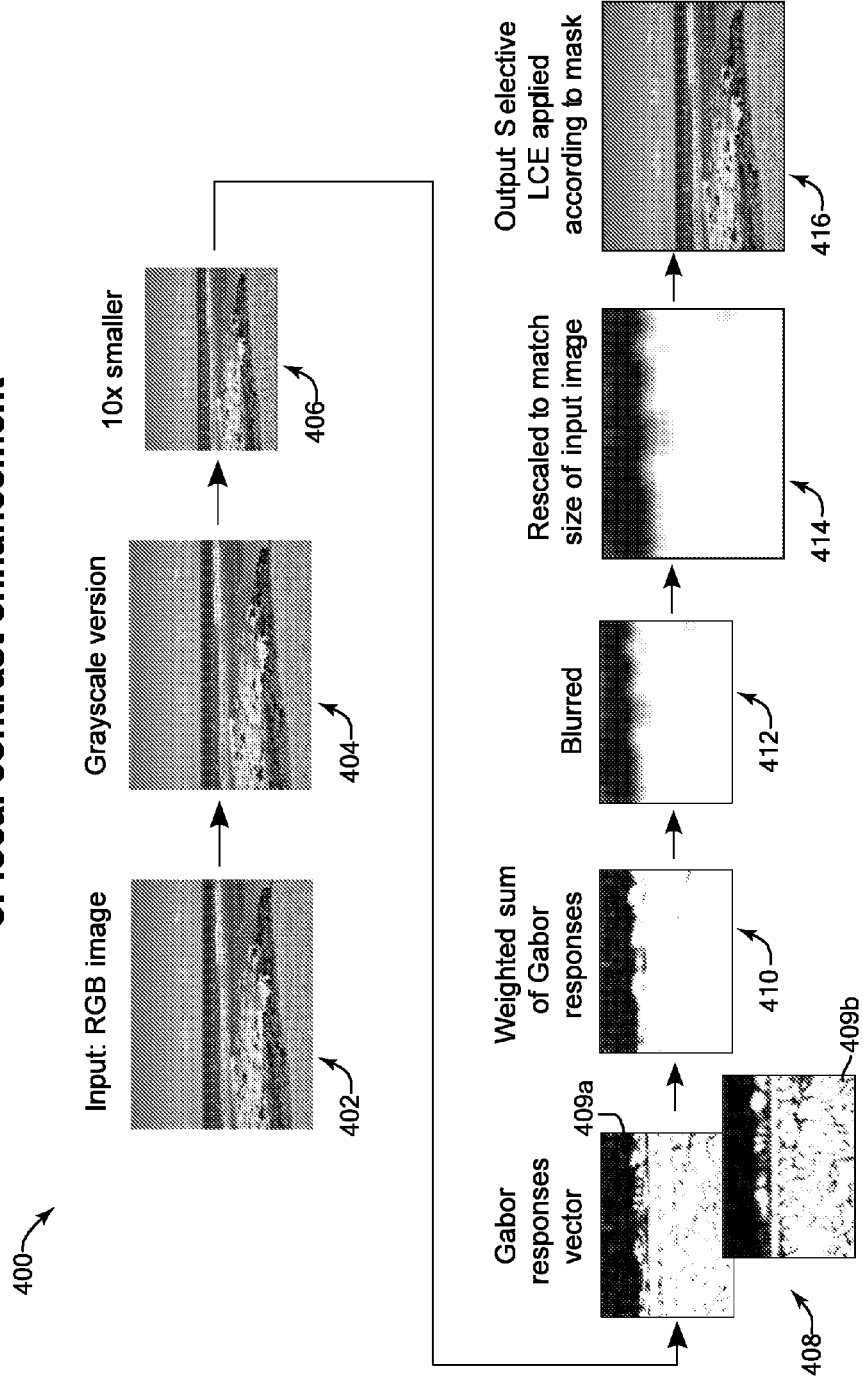
FIG. 4 is a diagram illustrating use of the method of FIG. 3, according to some implementations.

FIG. 4 is a block diagram illustrating an example implementation 400 of the method of FIG. 3, e.g., showing automatic selective application of an adjustment operation to an image. An example original image 402 is input to the process. In some implementations or applications, the image 402 (and other image examples herein) can be received or obtained from a variety of sources, such as memory, storage drives, or other storage of one or more users, and can be stored in a variety of formats, such as an image in the user's photo albums, an image frame in a movie or other video sequence, etc. The image can be processed as described below by a client or server device. In some implementations, the image can be displayed on a display device, e.g., of a client device 120, 122, 124, and/or 126 of FIG. 1, or a server system 102 in some implementations. In one non-limiting example, the user can view the image 402 displayed by a display device in a graphical interface provided by a client device or server device, and/or can similarly view the resulting output image 416 (described below).

In this example of FIG. 4, original image 402 is obtained by the system and can be analyzed and processed as described above with reference to FIG. 3. For example, the method can create a grayscale image 404 from the original image 402 as described in block 304. The method then reduces the size of the grayscale image 404 as described in block 306, to produce a smaller image 406. Smaller image 406 is 10 times smaller than image 404, in this example.

The method then processes the smaller image 406 to detect texture regions and produces results of that processing, as described in block 308. In this example, the method uses a number of Gabor filters at three different scales and six different orientations at each scale, to produce 18 Gabor responses in a Gabor responses vector 408. For example, two of the Gabor responses 409a and 409b are shown in FIG. 4, where response 409a was processed at scale 2 and orientation 0° and response 409b was processed at scale 4 and orientation 150°, and each response is a sum of two Gabor responses with different phases as described in the example above.

The method then takes a weighted sum of the Gabor responses in vector 408 to produce a single resulting mask 410, as described in block 310. In this example, the mask values range from 0-255, where 0 values are shown as black and indicate that no amount of the adjustment operation should be applied at those pixels, values of 255 are shown as white to indicate that a full amount of the adjustment operation should be applied at those pixels, and values between these extremes indicate a partial amount of application based on the magnitude. The method then performs a blurring operation to the mask 410 as in block 312 to produce a blurred mask 412, thus providing gradual transitions between jumps in mask values. The method then re-scales the blurred mask 412 to the size of the original image 402, producing the scaled mask 414.

Finally, the method selectively and variably applies an adjustment operation to the original image based on scaled mask 414. In this example, the adjustment operation is a local contrast enhancement operation. Thus, local contrast enhancement is fully applied to portions of the original image 402 that correspond to white areas of the mask, is partially applied to portions of the original image 402 that correspond to grey areas of the mask, and is not applied to portions of the original image 402 that correspond to black areas of the mask. The result of applying the local contrast enhancement is the output image 416. In the case of applying some other types of adjustment operations, such as local contrast reduction, the inverse of the scaled mask 414 can be used to apply those operations.

Figure 5A:
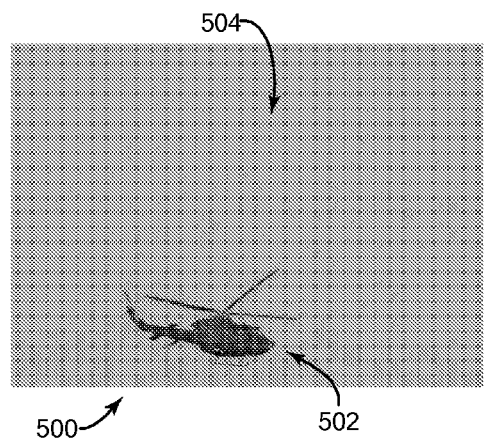
FIGS. 5A-5D, 6A-6D, 7A-7D, and 8A-8D are example illustrations of images and masks processed according to features of the methods of FIGS. 2 and 3.
Figure 5B:
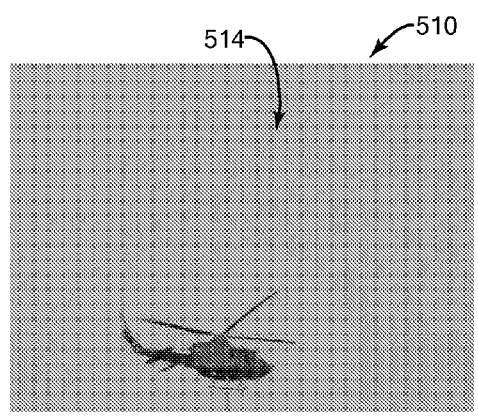

FIGS. 5A-5D are illustrations of example images processed according to one or more features of the implementations described above. In FIG. 5A, an original image 500 is shown. Image 500 includes a detailed (texture) portion 502 of a helicopter and a large featureless or flat portion 504 showing sky. The sky portion 504 includes some noise as is common in such image areas. FIG. 5B shows an image 510 which can result from using a local contrast enhancement operation over the entire original image 500. As shown, sky portion 514 includes noise that has been amplified since the local contrast enhancement has been applied to the sky portion 504 of image 500.

Figure 5C:
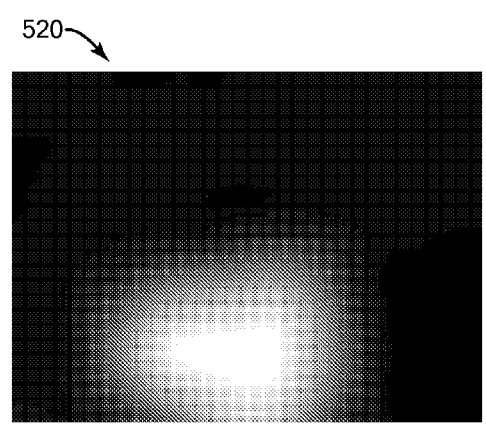
Figure 5D:
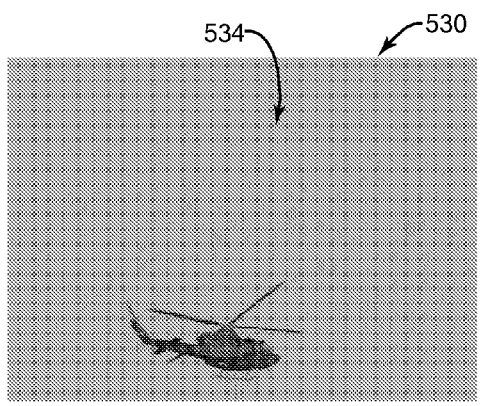

FIG. 5C shows an example of a texture mask 520 derived from original image 500 using techniques described above, and includes white pixel values for texture regions to receive full application of the local contrast enhancement operation, black pixel values for regions having lack of texture and no application of the operation, and grey pixel values for regions located between the texture regions and the other regions for partial application of the operation. FIG. 5D shows an output image 530 resulting from the application of a local contrast enhancement operation to the original image 500 based on mask values of the mask 520, as described above in FIGS. 3 and 4. As shown, a sky portion 534 of output image 530 does not have the amplified noise of image 510, since the local contrast enhancement operation was masked from the sky portion 504 of image 500.

Figure 6A:
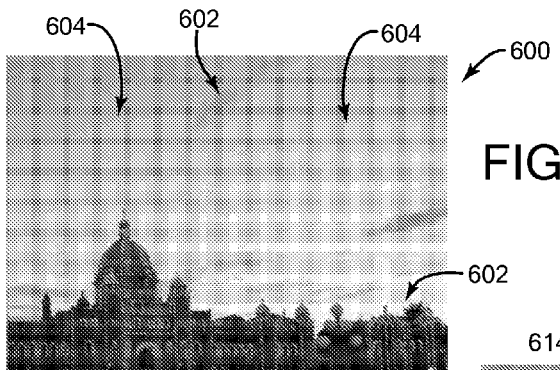
Figure 6B:
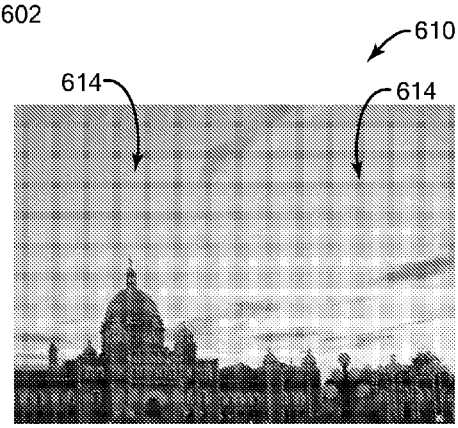

FIGS. 6A-6D are illustrations of additional example images processed according to one or more features described above. In FIG. 6A, an original image 600 is shown. Image 600 includes regions 602 that include detail detected as texture by the method, including buildings at the bottom of the image and clouds in the sky portion of the image. Image 600 also includes sky portions 604 that have a gradual color change and little or no texture. FIG. 6B shows an image 610 resulting from applying a local contrast enhancement operation to the entire image 600. Similarly as image 510, the sky portion 614 includes noise created from applying this operation in that portion of the image 600.

Figure 6C:
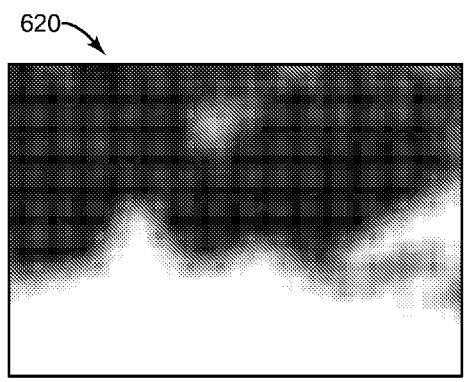
Figure 6D:
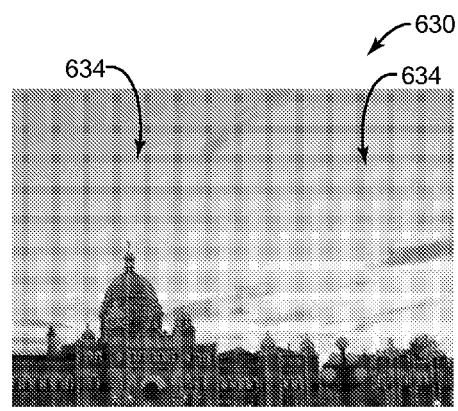

FIG. 6C shows an example of a texture mask 620 derived from original image 600 using techniques described above, and includes white (texture), black (no texture), and grey (between white and black) values similarly as described above. FIG. 6D shows an output image 630 resulting from the application of a local contrast enhancement operation to the original image 600 based on mask values of the mask 620. As shown, a sky portion 634 of output image 630 does not have the amplified noise of image 610, since the local contrast enhancement operation was masked from the sky portion 604 of image 600.

Figure 7A:
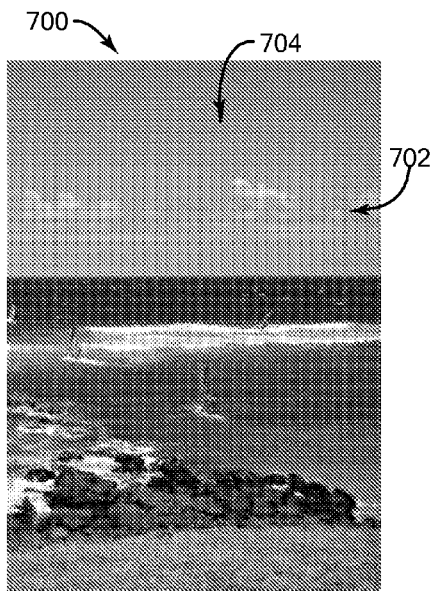
Figure 7B:
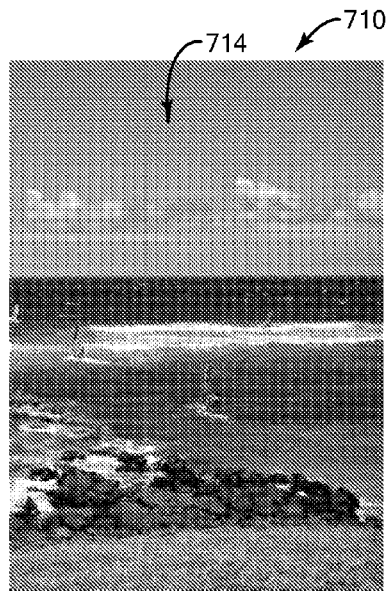

FIGS. 7A-7D are illustrations of additional example images processed according to one or more features described above. In FIG. 7A, an original image 700 is shown. Image 700 includes regions including higher amounts of detail, which in this case is most of the image from the bottom border up to the clouds 702. Image 700 also includes an upper sky portion 704 positioned above the clouds 702 and which is a flat region including more noise. FIG. 7B shows an image 710 resulting from applying a local contrast enhancement operation to the entire image 700. The upper sky portion 714 includes noise created from applying the operation in that portion of the image 700.

Figure 7C:
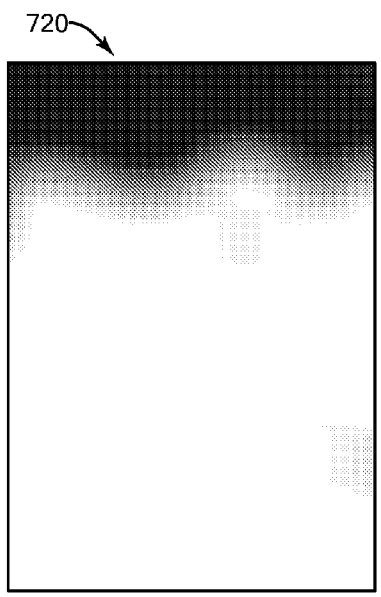
Figure 7D:
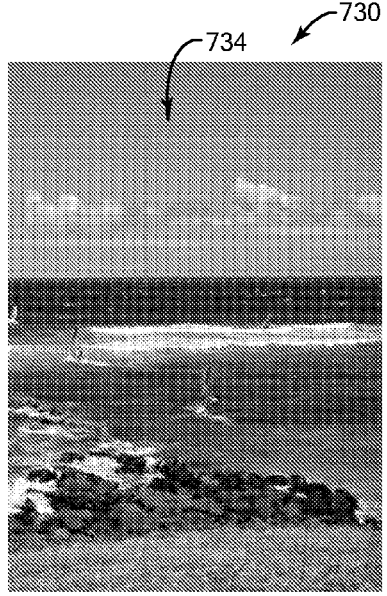

FIG. 7C shows an example of a mask 720 derived from original image 700 using techniques described above, and includes white (texture), black (no texture), and grey (between white and black) values similarly as described above. Although different types of subjects are depicted in the lower portion of the image 700, such as grass, rocks, water, and sky, these subjects are all detected as the same, single texture region indicated as (mostly) white pixels in the mask 720, since they all include high enough detail (e.g., enough edges at a high enough scale) to be detected as texture. Only the upper sky portion 704 is detected as a non-texture region for the mask 720. FIG. 7D shows an output image 730 resulting from the application of a local contrast enhancement operation to the original image 700 based on mask values of the mask 720. As shown, upper sky portion 734 of output image 730 does not have the amplified noise of image 710, since the local contrast enhancement operation was masked from the sky portion 704 of image 700.

Figure 8A:
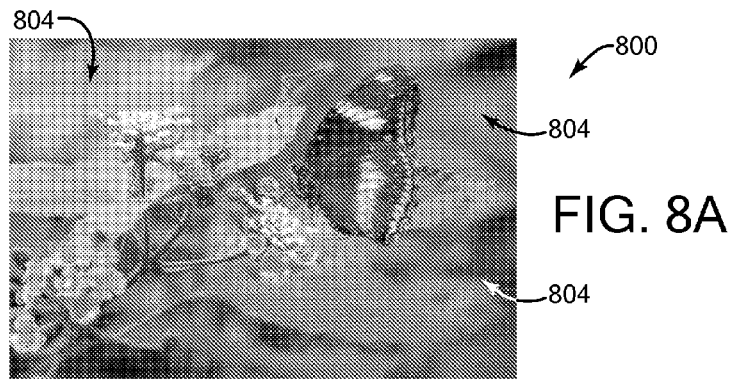
Figure 8B:
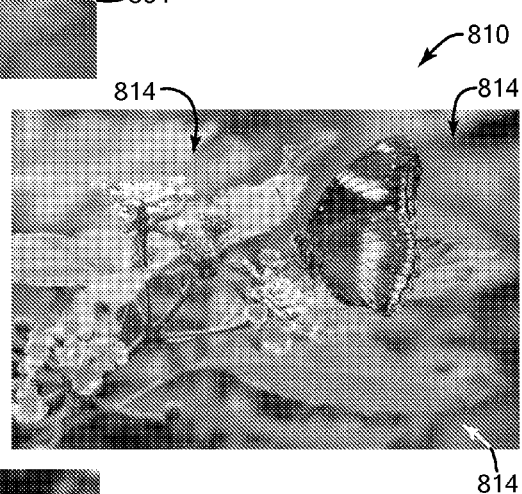

FIGS. 8A-8D are illustrations of additional example images processed according to one or more features described above. In FIG. 8A, an original image 800 is shown. Image 800 includes regions including higher amounts of detail, which in this case are foreground objects that are in focus, e.g., the butterfly and foreground flowers and leaves. Image 800 also includes background regions 804 which are out of focus. FIG. 8B shows an image 810 resulting from applying a local contrast enhancement operation to the entire image 800. The background regions 814 have had their local contrast increased just like the in-focus regions. In some cases, this is not a desired effect because the in-focus foreground regions are not as noticeable to a user as in image 800, despite having a local contrast enhancement applied in image 810.

Figure 8C:
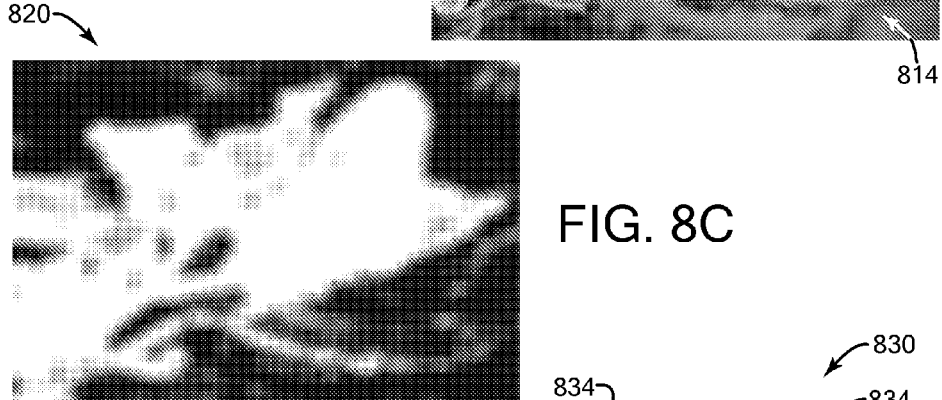
Figure 8D:
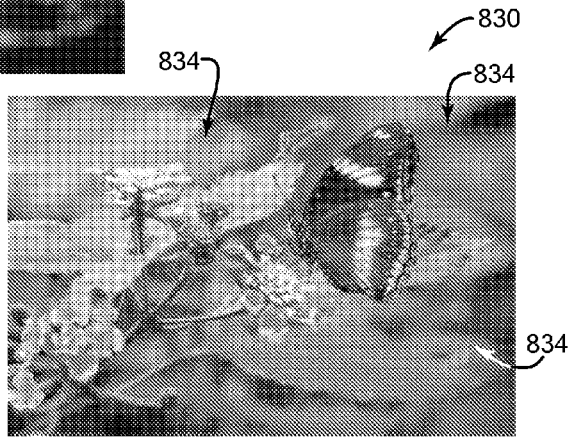

FIG. 8C shows an example of a mask 820 derived from original image 800 using techniques described above, and includes white (texture), black (no texture), and grey (between white and black) values similarly as described above. As shown, the in-focus foreground regions are detected as texture regions and assigned white (or near-white) values in the mask 820. The out-of-focus background regions have too much gradual change in color values to be detected as texture regions, and so are detected as non-texture regions and are assigned black (or near-black) values in the mask 820. FIG. 8D shows an output image 830 resulting from the application of a local contrast enhancement operation to the original image 800 based on mask values of the mask 820.

As shown, the background regions 834 were masked from the local contrast enhancement operation and so remain more out of focus than in the corresponding regions 814 of image 810. This allows local contrast enhancement applied to foreground objects to have a more noticeable effect, since the background regions are not also enhanced.

In other implementations, the mask 820 can be inverted such that white and black values are reversed, and a different adjustment operation can be applied to the image 800. For example, a local contrast reduction operation or a blur operation can be applied to image 800. Using the inverse mask, such an operation can be applied to the background regions 804 and not to the foreground regions. This would allow the background regions to have their contrast reduced and/or be smoothed by the adjustment operation to further visually emphasize and bring out the foreground regions in the output image.

Figure 9:
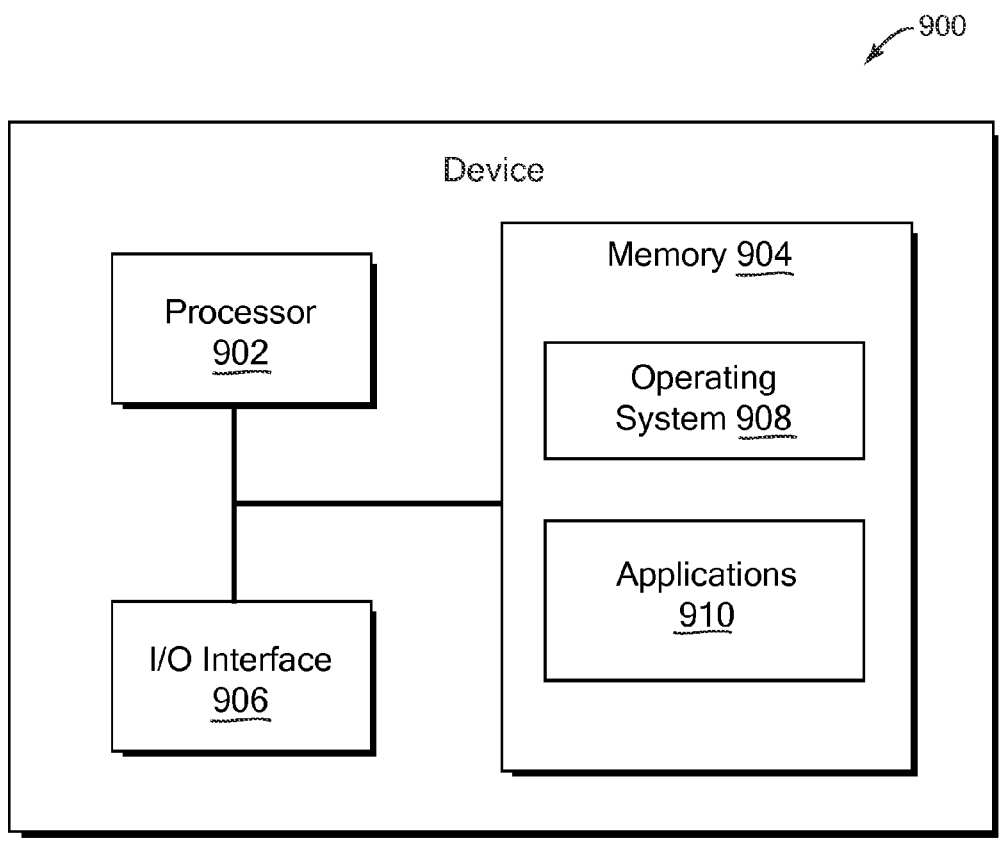
FIG. 9 is a block diagram of an example device that may be used for one or more implementations described herein.

FIG. 9 is a block diagram of an example device 900 which may be used to implement one or more features described herein. In one example, device 900 may be used to implement server device 104 of FIG. 1, and perform appropriate method implementations described herein. Device 900 can be any suitable computer system, server, or other electronic or hardware device. For example, the device 900 can be a mainframe computer, desktop computer, workstation, portable computer, or electronic device (portable device, cell phone, smart phone, tablet computer, television, TV set top box, personal digital assistant (PDA), media player, game device, etc.). In some implementations, device 900 includes a processor 902, a memory 904, and input/output (I/O) interface 906.

Processor 902 can be one or more processors or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the device 900 by the processor 902, including an operating system 908 and one or more applications engines 910 such as a graphics editing engine, web hosting engine, social networking engine, etc. In some implementations, the applications engines 910 can include instructions that enable processor 902 to perform the functions described herein, e.g., some or all of the methods of FIGS. 2, 3, and/or 4. Any of software in memory 904 can alternatively be stored on any other suitable storage location or computer-readable medium. In addition, memory 904 (and/or other connected storage device(s)) can store input, output, and intermediary images, adjustment operations, parameters, filter responses, mask values, and other data used in the features described herein. Memory 904 and any other type of storage (magnetic disk, optical disk, magnetic tape, or other tangible media) can be considered "storage devices."

I/O interface 906 can provide functions to enable interfacing the device 900 with other systems and devices. For example, network communication devices, storage devices such as memory and/or database 106, and input/output devices can communicate via interface 906. In some implementations, the I/O interface can connect to interface devices such as input devices (keyboard, pointing device, touchscreen, microphone, camera, scanner, etc.) and output devices (display device, speaker devices, printer, motor, etc.).

For ease of illustration, FIG. 9 shows one block for each of processor 902, memory 904, I/O interface 906, and software blocks 908 and 910. These blocks may represent one or more processors or processing circuitries, operating systems, memories, I/O interfaces, applications, and/or software modules. In other implementations, device 900 may not have all of the components shown and/or may have other elements including other types of elements instead of, or in addition to, those shown herein. While system 102 is described as performing steps as described in some implementations herein, any suitable component or combination of components of system 102 or similar system, or any suitable processor or processors associated with such a system, may perform the steps described.

A client device can also implement and/or be used with features described herein, such as client devices 120-126 shown in FIG. 1. Example client devices can include some similar components as the device 900, such as processor(s) 902, memory 904, and I/O interface 906. An operating system, software and applications suitable for the client device can be provided in memory and used by the processor, such as client group communication application software. The I/O interface for a client device can be connected to network communication devices, as well as to input and output devices such as a microphone for capturing sound, a camera for capturing images or video, audio speaker devices for outputting sound, a display device for outputting images or video, or other output devices. A display device, for example, can be used to display the settings, notifications, and permissions as described herein, where such device can include any suitable display device such as an LCD, LED, or plasma display screen, CRT, television, monitor, touchscreen, 3-D display screen, or other visual display device. Some implementations can provide an audio output device, such as voice output or synthesis that speaks text and/or describes settings, notifications, and permissions.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
    determining one or more texture regions having detected texture in a first image;
    generating a mask image from the first image based on the detected texture regions, wherein the one or more texture regions are distinguished in the mask image from other regions of the first image that do not have detected texture, wherein the mask image includes multiple values, wherein each value of the mask corresponds to a pixel of the image, and each value of the mask indicates an amount by which the one or more adjustment operations are to be applied to the corresponding pixel of the image, wherein the mask image includes values indicating to apply the one or more adjustment operations by a greater amount to the detected texture regions and values indicating to apply the one or more adjustment operations by a lesser amount to the other regions of the first image not having detected texture; and
    applying, using a computer graphics processing device, one or more adjustment operations to the first image in amounts based on the values of the mask image.

2. The method of claim 1 wherein the detected texture regions have a predetermined range of scales of detected texture and wherein the detected texture at the predetermined range of scales is above a noise scale.

3. The method of claim 1 wherein the detected texture regions have pixel edges providing texture detail at one or more scales above a noise scale.

4. The method of claim 3 wherein the texture regions do not include image regions that depict flat features.

5. The method of claim 1 further comprising converting the first image to a monochromatic image before generating the mask image.

6. The method of claim 1 further comprising:
    resizing the first image to a smaller size before generating the mask image, and
    resizing the generated mask image to the size of the first image.

7. The method of claim 1 further comprising blurring the mask image before applying the adjustment operation.

8. The method of claim 1 wherein determining one or more texture regions includes using a plurality of wavelet-based filters, wherein using a plurality of wavelet-based filters includes using multiple different scales and directions of wavelet-based filters on the first image, and
    wherein generating the mask includes determining a weighted sum of responses of the wavelet-based filters, wherein the responses of the wavelet-based filters are weighted in the weighted sum based on the scales of the wavelet-based filters providing the responses.

9. The method of claim 8 wherein the determining one or more texture regions includes using at least one of:
    one or more Gabor filters, one or more Haar discrete wavelet transforms, and one or more Daubechies wavelet transforms.

10. The method of claim 8 wherein one or more of the responses of the wavelet-based filters are determined at one or more first scales that are higher than one or more second scales and are weighted higher in the weighted sum than one or more others of the responses of the wavelet-based filters determined at the one or more second scales.

11. The method of claim 1 wherein the mask image includes a continuous range of values between first and second values, wherein the first value is at a first end of the continuous range and indicates full application of the one or more adjustment operations, and wherein the second value is at a second end of the continuous range and indicates no application of the one or more adjustment operations.

12. The method of claim 1 wherein the one or more adjustment operations include a local contrast enhancement operation, and wherein the values of the mask image indicate to apply the local contrast enhancement operation by a greater amount to the detected texture regions and by a lesser amount to the other regions of the first image not having detected texture.

13. A system comprising:
    a storage device; and
    at least one processor of a computer graphics processing device accessing the storage device and operative to perform operations including:
    determining one or more texture regions having detected texture in a first image;
    generating a mask image from the first image based on the detected texture regions, wherein the detected texture regions are distinguished in the mask image from other regions of the first image that do not have detected texture, wherein the mask image includes a continuous range of values between first and second values, wherein the first value is at a first end of the continuous range and indicates full application of the one or more adjustment operations, and wherein the second value is at a second end of the continuous range and indicates no application of the one or more adjustment operations; and
    applying one or more adjustment operations to the first image in amounts based on values of the mask image.

14. The system of claim 13 wherein the one or more adjustment operations include at least one of a local contrast reduction operation, a blur operation, and a de-noising operation, and wherein the values of the mask image indicate to apply the one or more adjustment operations by a lesser amount to the detected texture regions and by a greater amount to the other regions of the first image not having detected texture.

15. The system of claim 13 wherein the mask image includes values indicating to apply the one or more adjustment operations by a greater amount to the detected texture regions and by a lesser amount to the other regions of the first image not having detected texture.

16. The system of claim 13 wherein the operation of determining one or more texture regions includes using a plurality of wavelet-based filters, including using multiple different scales and directions of wavelet-based filters on the first image, and wherein the operation of generating the mask image includes determining a weighted sum of responses of the wavelet-based filters, wherein the responses of the wavelet-based filters are weighted in the weighted sum based on the scales of the wavelet-based filters providing the responses.

17. A nontransitory computer readable medium having stored thereon software instructions that, when executed by one or more processors, cause the one or more processors to perform operations including:

determining one or more texture regions having detected texture in a first image;

generating a mask image from the first image based on the detected texture regions, wherein the detected texture regions are distinguished in the mask image from other regions of the first image that do not have detected texture, and wherein the mask image includes values indicating to apply the one or more adjustment operations by a lesser amount to the detected texture regions and by a greater amount to the other regions of the first image not having detected texture; and applying, using a computer graphics processing device, one or more adjustment operations to the first image in amounts based on values of the mask image, wherein the one or more adjustment operations include at least one of a local contrast reduction operation, a blur operation, and a de-noising operation.

18. The computer readable medium of claim 17 wherein the mask image includes a continuous range of values between first and second values, wherein the first value is at a first end of the continuous range and indicates full application of the one or more adjustment operations, and wherein the second value is at a second end of the continuous range and indicates no application of the one or more adjustment operations.

19. The computer readable medium of claim 17 wherein determining one or more texture regions includes using a plurality of wavelet-based filters, including using multiple different scales and directions of wavelet-based filters on the first image, and wherein generating the mask image includes determining a weighted sum of responses of the wavelet-based filters, wherein the responses of the wavelet-based filters are weighted in the weighted sum based on the scales of the wavelet-based filters providing the responses.

20. The system of claim 16 wherein one or more of the responses of the wavelet-based filters are determined at one or more first scales that are higher than one or more second scales and are weighted higher in the weighted sum than one or more others of the responses of the wavelet-based filters determined at the one or more second scales.

* * * * *

UNITED STATES PATENT AND TRADEMARK OFFICE
CERTIFICATE OF CORRECTION

PATENT NO. : 9,639,956 B2  
APPLICATION NO. : 14/575225  
DATED : May 2, 2017  
INVENTOR(S) : Krishnaswamy et al.

Page 1 of 1

It is certified that error appears in the above-identified patent and that said Letters Patent is hereby corrected as shown below:

In the Claims

In Column 19, Lines 48-49, please delete:
"detected texture at the predetermined range of scales is above a noise scale."
And insert:
-- predetermined range of scales is above a noise scale. -- therefor.

Signed and Sealed this
Twenty-eighth Day of September, 2021

Drew Hirshfeld
*Performing the Functions and Duties of the*
*Under Secretary of Commerce for Intellectual Property and*
*Director of the United States Patent and Trademark Office*